United States Patent
Anwar et al.

(10) Patent No.: US 6,825,624 B2
(45) Date of Patent: Nov. 30, 2004

(54) HILL HOLD FOR ELECTRIC VEHICLE

(75) Inventors: Mohammad Nazmul Anwar, Westland, MI (US); Mehrdad Teimor, Troy, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 48 days.

(21) Appl. No.: 10/386,075

(22) Filed: Mar. 11, 2003

(65) Prior Publication Data

US 2004/0178754 A1 Sep. 16, 2004

(51) Int. Cl.[7] .................................................. H02P 7/00
(52) U.S. Cl. ...................... 318/432; 318/433; 318/801
(58) Field of Search ................................ 318/432, 433, 318/727, 801, 807, 811

(56) References Cited

U.S. PATENT DOCUMENTS

| 5,788,596 | A | 8/1998 | Robinson et al. |
| 6,054,776 | A | 4/2000 | Sumi |
| 6,093,974 | A | 7/2000 | Tabata et al. |
| 6,124,645 | A | 9/2000 | Jones et al. |
| 6,229,261 | B1 | 5/2001 | Weiberle et al. |
| 6,256,570 | B1 | 7/2001 | Weiberle et al. |
| 6,282,954 | B1 | 9/2001 | Ott et al. |
| 6,315,372 | B1 | 11/2001 | Kröger et al. |
| 2002/0094899 | A1 | 7/2002 | Hamai |
| 2002/0116099 | A1 | 8/2002 | Tabata et al. |
| 2002/0117338 | A1 | 8/2002 | Itou |
| 2002/0140291 | A1 * | 10/2002 | Osada et al. ................ 307/10.6 |
| 2002/0163319 | A1 * | 11/2002 | Kaneko et al. .............. 318/727 |

* cited by examiner

Primary Examiner—Karen Masih
(74) Attorney, Agent, or Firm—MacMillan, Sobanski & Todd LLC

(57) ABSTRACT

A hill hold apparatus and operating strategy for an electric or hybrid electric vehicle is disclosed. The apparatus includes a three-phase machine that is coupled to drive wheels. The machine is powered by a pulse width modulated inverter having at least a first half-bridge coupled to a first machine phase, a second half-bridge coupled to a second machine phase, and a third half-bridge coupled to a third machine phase. The operating strategy employs predetermined switching modes to minimize and distribute the power loss among the power switches in the inverter and the machine phases.

9 Claims, 4 Drawing Sheets

FIG. 4

| SWITCH | HALF-BRIDGE a | | HALF-BRIDGE b | | HALF-BRIDGE c | |
|---|---|---|---|---|---|---|
| | $S_1$ | $S_4$ | $S_3$ | $S_6$ | $S_5$ | $S_2$ |
| ON/OFF STATUS (% OF $T_a$) | Q1 ON 100% D1 OFF 100% | Q4 OFF 100% D4 OFF 100% | Q3 OFF 100% D3 ON (100−A)% | Q6 ON A% D6 OFF 100% | Q5 OFF 100% D5 ON (100−A)% | Q2 ON A% D2 OFF 100% |

FIG. 6

| SWITCH | HALF-BRIDGE ha | | HALF-BRIDGE hb | | HALF-BRIDGE hc | |
|---|---|---|---|---|---|---|
| | $S_1$ | $S_4$ | $S_3$ | $S_6$ | $S_5$ | $S_2$ |
| CURRENT (PER UNIT) | 1 | 0 | 0.5 | 0.5 | 0.5 | 0.5 |
| POWER LOSS (WATT) | $Q_C$ | 0 | $\dfrac{D_c}{2}\left(1-\dfrac{A}{100}\right)+\dfrac{D_r}{2}$ | $\dfrac{Q_c}{2}\cdot\dfrac{A}{100}+\dfrac{Q_s}{2}$ | $\dfrac{D_c}{2}\left(1-\dfrac{A}{100}\right)+\dfrac{D_r}{2}$ | $\dfrac{Q_c}{2}\cdot\dfrac{A}{100}+\dfrac{Q_s}{2}$ |
| $\Sigma(S_1+S_4)$: ha $\Sigma(S_3+S_6)$: hb $\Sigma(S_5+S_2)$: hc | $Q_C$ | | $\dfrac{D_c}{2}\left(1-\dfrac{A}{100}\right)+\dfrac{D_r}{2}+\dfrac{Q_c}{2}\cdot\dfrac{A}{100}+\dfrac{Q_s}{2}$ | | $\dfrac{D_c}{2}\left(1-\dfrac{A}{100}\right)+\dfrac{D_r}{2}+\dfrac{Q_c}{2}\cdot\dfrac{A}{100}+\dfrac{Q_s}{2}$ | |
| TOTAL INVERTER POWER LOSS (WATT) | $Q_c\left(1+\dfrac{A}{100}\right)+D_c\left(1-\dfrac{A}{100}\right)+Q_s+D_r$ | | | | | |

| REGION | SWITCHING MODE | ON/OFF STATUS (% OF $T_a$) | | | | | | SWITCHING PATTERNS | PHASE CURRENT |
|---|---|---|---|---|---|---|---|---|---|
| | | S1 | S4 | S3 | S6 | S5 | S2 | A% of $T_a$  A% of $T_a$  $T_a$ | |
| I | MODE 1(A% OF $T_a$) AND MODE 7(100-A% OF $T_a$) | $Q_1$ ON: 100  $Q_4$ OFF: 100  $D_1$ OFF: 100  $D_4$ OFF: 100 | | $Q_3$ OFF: 100  $D_3$ ON: 100-A | $Q_6$ ON: A  $D_6$ OFF: 100 | $Q_5$ OFF: 100  $D_5$ ON: 100-A | $Q_2$ ON: A  $D_2$ OFF: 100 | $S_1$ $S_3$ $S_5$ | $\|i_a\| = 2\|i_b\| = 2\|i_c\|$ |
| II | MODE 6(A% OF $T_a$) AND MODE 8(100-A% OF $T_a$) | $Q_6$ ON: A  $D_6$ OFF: 100 | $Q_5$ ON: 100  $D_5$ OFF: 100 | $Q_3$ OFF: 100  $D_3$ ON: 100-A | | $Q_6$ OFF: A  $D_6$ ON: 100-A | $Q_5$ ON: 100  $D_5$ ON: 100-A | $S_1$ $S_3$ $S_5$ | $\|i_b\| = 2\|i_a\| = 2\|i_c\|$ |
| III | MODE 5(A% OF $T_a$) AND MODE 7(100-A% OF $T_a$) | $Q_5$ OFF: 100  $D_5$ ON: 100-A | $Q_6$ ON: A  $D_6$ OFF: 100 | $Q_3$ OFF: 100  $D_3$ ON: 100-A | $Q_1$ ON: 100  $D_1$ OFF: 100 | | $Q_4$ ON: 100  $D_4$ OFF: 100 | $S_1$ $S_3$ $S_5$ | $\|i_c\| = 2\|i_b\| = 2\|i_a\|$ |

FIG. 8

| PHASES | CURRENTS (PER UNIT) | | | AVERAGE ($I^2R$) LOSS ON PHASE WINDINGS |
|---|---|---|---|---|
| | REGION-I | REGION-II | REGION-III | |
| $P_a$ | $i_{a(I)}=1.0$ | $i_{a(II)}=0.5$ | $i_{a(III)}=-0.5$ | $\dfrac{R_p}{T_p}\left[\int_0^{T_p/3}(i_{a(I)})^2\,dt + \int_{T_p/3}^{2T_p/3}(i_{a(II)})^2\,dt + \int_{2T_p/3}^{T_p}(i_{a(III)})^2\,dt\right] = \dfrac{R_p}{2}$ |
| $P_b$ | $i_{b(I)}=-0.5$ | $i_{b(II)}=-1.0$ | $i_{b(III)}=0.5$ | $\dfrac{R_p}{T_p}\left[\int_0^{T_p/3}(i_{b(I)})^2\,dt + \int_{T_p/3}^{2T_p/3}(i_{b(II)})^2\,dt + \int_{2T_p/3}^{T_p}(i_{b(III)})^2\,dt\right] = \dfrac{R_p}{2}$ |
| $P_c$ | $i_{c(I)}=-0.5$ | $i_{c(II)}=0.5$ | $i_{c(III)}=1.0$ | $\dfrac{R_p}{T_p}\left[\int_0^{T_p/3}(i_{c(I)})^2\,dt + \int_{T_p/3}^{2T_p/3}(i_{c(II)})^2\,dt + \int_{2T_p/3}^{T_p}(i_{c(III)})^2\,dt\right] = \dfrac{R_p}{2}$ |

FIG. 9

HILL HOLD FOR ELECTRIC VEHICLE

BACKGROUND OF INVENTION

The present invention relates to a hill hold for a vehicle, and more particularly to a hill hold employing a machine in an electric or hybrid electric vehicle.

Conventionally, an automotive vehicle that is temporarily stopped on an incline can be kept from rolling backwards by an engine providing a low level of torque to a torque converter coupled to an automatic transmission or by a clutch coupled to a manual transmission. Of course, the vehicle brakes can be employed as well, but there are situations when the vehicle operator wants to maintain the vehicle position without engaging the brakes. These situations may arise when a vehicle is stopped at a traffic light or stop sign on a hill and the vehicle operator is preparing to accelerate the vehicle through the intersection.

Electric and hybrid electric vehicles are now coming into use where the engine, if there is one, does not always operate while the vehicle is temporarily stopped. In these vehicles, the vehicle operator may also wish to maintain the vehicle position on an incline without employing the brakes. Some have attempted to accomplish this through various mechanical means, while others have attempted to employ a motor to hold the vehicle in place. In order to hold the vehicle in place with the motor, it operates at zero speed but must maintain just enough torque to hold the vehicle from rolling backwards. When operating under this condition, the motor and inverter will use energy stored in the batteries and may experience significant localized heating concerns. Since the traveling range of electric vehicles is somewhat limited due to battery energy storage limitations, it is desirable to use the least amount of energy as possible. Also, with the motor operating at zero rotation, which is not the normal mode of operation, some components within the electric drive circuitry may experience more heat than is desirable.

Thus, it is desirable to employ a machine in an electric or hybrid electric vehicle that is capable of maintaining a vehicle in a stopped position on an incline, while also minimizing the total power loss (energy used) and distributing the power in order to minimize the heat concentration on individual components of the machine and inverter.

SUMMARY OF THE INVENTION

In its embodiments, the present invention contemplates a method of maintaining a vehicle in a stopped position on an incline comprising the steps of: coupling a machine with at least a first phase, a second phase, and a third phase to at least one drive wheel of the vehicle; selectively supplying energy to the first phase, the second phase and the third phase with a pulse width modulated inverter having at least a first half-bridge coupled to the first phase, a second half-bridge coupled to the second phase, and a third half-bridge coupled to the third phase; and maintaining a torque in the machine at an approximately zero rotational speed by switching the inverter between one of: a mode 1 for a first percentage of a pulse width modulated switching period and a mode 7 a remaining percentage of the pulse width modulated switching period; a mode 2 for the first percentage of the pulse width modulated switching period and the mode 7 the remaining percentage of the pulse width modulated switching period; and a mode 6 for the first percentage of the pulse width modulated switching period and the mode 7 for the remaining percentage of the pulse width modulated switching period.

The present invention further contemplates a method of maintaining a vehicle in a stopped position on an incline comprising the steps of: coupling a machine with at least a first phase, a second phase, and a third phase to at least one drive wheel of the vehicle; selectively supplying energy to the first phase, the second phase and the third phase with a pulse width modulated inverter having at least a first half-bridge coupled to the first phase, a second half-bridge coupled to the second phase, and a third half-bridge coupled to the third phase; and maintaining a torque in the machine at an approximately zero rotational speed by: switching the inverter between a mode 1 for a first percentage of a pulse width modulated switching period and a mode 7 a remaining percentage of the pulse width modulated switching period, for about a first one third of a predetermined time period, with the predetermined time period being at least three times longer than the pulse width modulated switching period; switching the inverter between a mode 6 for the first percentage of the pulse with modulated switching period and a mode 8 the remaining percentage of the pulse width modulated switching period, for about a second one third of the predetermined time period; and switching the inverter between a mode 5 for the first percentage of the pulse width modulated switching period and the mode 7 the remaining percentage of the pulse width modulated switching period, for about a third one third of the predetermined time period.

An embodiment of the present invention also contemplates a hill hold apparatus. The hill hold apparatus includes a machine adapted to couple to and drive at least one drive wheel of the vehicle, with the machine including at least a first phase, a second phase, and a third phase. A pulse width modulated inverter has at least a first half-bridge coupled to the first phase, a second half-bridge coupled to the second phase, and a third half-bridge coupled to the third phase, with the inverter adapted to connect to a source of electrical energy. A machine controller is connected to and adapted to control first half-bridge, the second half-bridge and the third half-bridge of the inverter, and includes a hill hold strategy for controlling the inverter to maintain a torque in the machine at an approximately zero rotational speed by switching the inverter between one of: a mode 1 for a first percentage of a pulse width modulated switching period and a mode 7 a remaining percentage of the pulse width modulated switching period, a mode 2 for the first percentage of the pulse width modulated switching period and the mode 7 the remaining percentage of the pulse width modulated switching period; and a mode 6 for the first percentage of the pulse width modulated switching period and the mode 7 for the remaining percentage of the pulse width modulated switching period.

An advantage of an embodiment of the present invention is that the power losses from the inverter are at or near minimum during hill hold operation, while evenly distributing the power losses among the inverter power switches in order to avoid overheating concerns.

Another advantage of an embodiment of the present invention is that the heat distribution among the machine phases will be relatively balanced, thus minimizing any possible load unbalance. By reducing the possible load unbalance due to uneven heating of the phases, the controller need not be programmed to account for this complexity.

BRIEF DESCRIPTION OF DRAWINGS

FIG. 4 is a table showing the on/off switching status for the six switches of FIG. 2 according to a preferred hill hold strategy;

FIG. 6 is a table showing expressions for power loss on each switch and half-bridge, as well as total power loss for the inverter when employed with a hill hold strategy of the present invention;

FIG. 8 is a table, similar to FIGS. 4 and 5 above, illustrating switching modes, switching patterns, and phase current applicable with a hill hold strategy of the present invention; and FIG. 9 is a table showing expressions for average heat loss for three phases of the machine when employing a hill hold strategy of the present invention.

DETAILED DESCRIPTION

Figure 1:
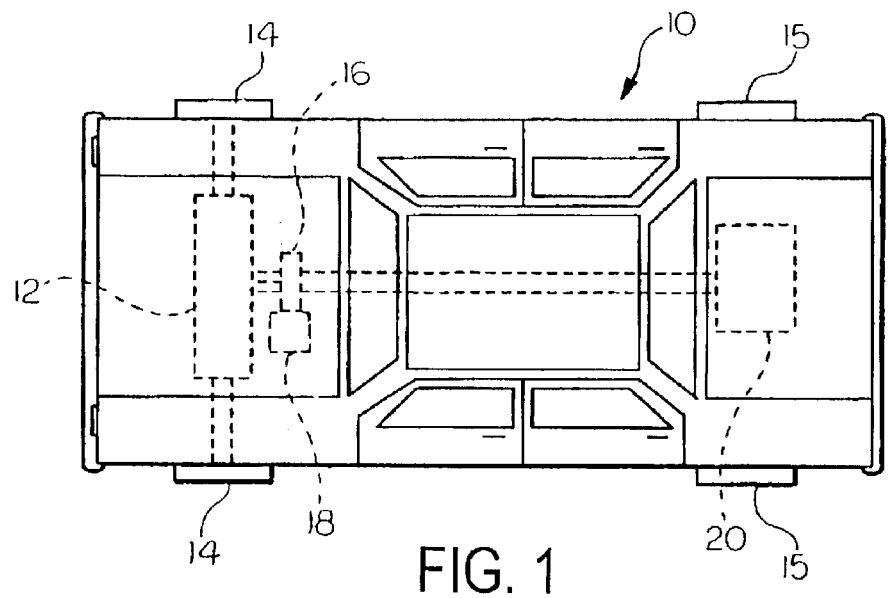
FIG. 1 is a schematic of an electric vehicle in accordance with the present invention.
Figure 2:
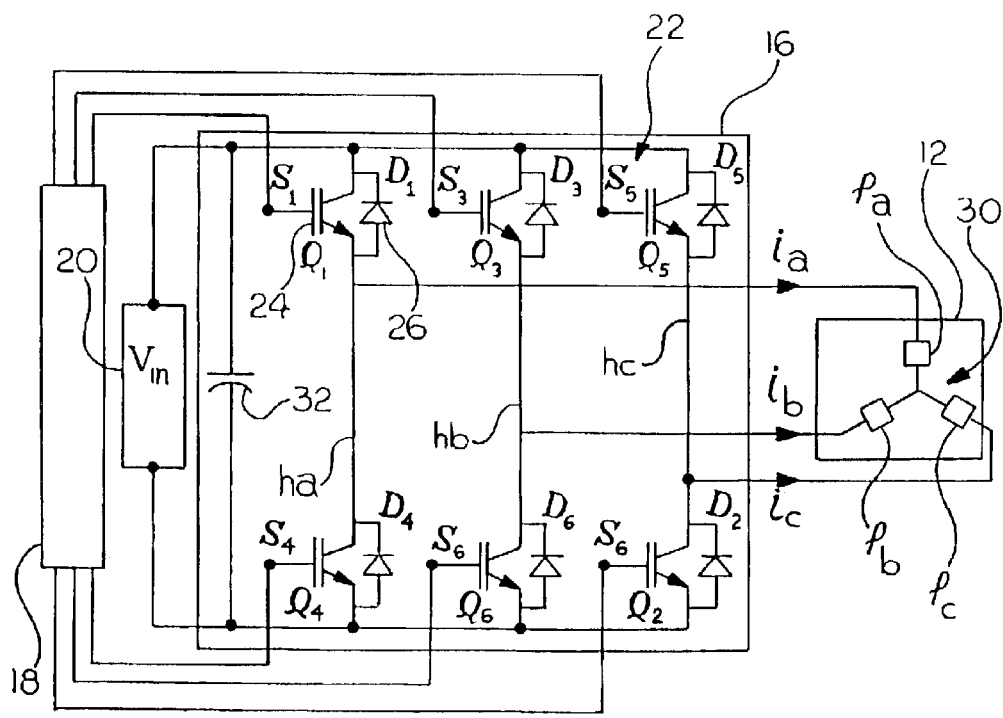
FIG. 2 is a schematic circuit diagram of a three phase inverter and motor that can be employed with the vehicle of FIG. 1, in accordance with the present invention.

FIGS. 1 and 2 illustrate a hybrid electric or an electric vehicle 10 that includes a traction machine 12, which can operate as a three-phase induction or permanent magnet motor. The machine 12 may also be configured to allow it to operate as a generator under other operating conditions, if so desired, but this is not necessary for the present invention to operate. The machine 12 is coupled to drive wheels 14, which, while shown in FIG. 1 as the front wheels, may be the rear wheels 15 or all four wheels. The machine 12 provides torque to drive the drive wheels 14 during normal operation of the vehicle 10 as well as during a hill hold event. An inverter 16 is connected to and drives the machine 12, and is in turn connected to and controlled by a machine controller 18. The inverter 16 is also connected to and receives power from an electrical energy source, such as a battery 20. The particular configuration and location of the components shown in the vehicle 10 are for illustrative purposes and may be located as needed for the particular size and type of hybrid electric or electric vehicle.

The inverter 16 is preferably a direct current (DC)-to-alternating current (AC), three-phase, pulse-width-modulated inverter with power switches 22. The inverter 16 illustrated in FIG. 2 has six power witches 22, identified as switch $S_1$ through $S_6$, with each switch preferably including an insulated gate transistor (IGBT) or metal-oxide-silicon field-effect transistor (MOSFET) switch 24 ($Q_1$ to $Q_6$) and a corresponding anti-parallel diode 26 ($D_1$ to $D_6$). The switches 22 are arranged in pairs to form three half-bridges 28, identified as half-bridges $h_a$, $h_b$ and $h_c$, with each half-bridge 28 supplying current, identified as $i_a$, $i_b$, and $i_c$, to a respective one of three phase windings 30 of the machine 12, identified as $P_a$, $P_b$ and $P_c$. A capacitor 32 is connected in parallel with the three half-bridges 28. While there are many different strategies that may be employed to cause the inverter 16 to supply just enough torque to the machine 12 to prevent the vehicle 10 from rolling backwards during a hill hold situation, many use too much power and/or concentrate the power (heat) loss on just a few components. In extreme cases, this overheating can cause switch failure.

Figure 3:
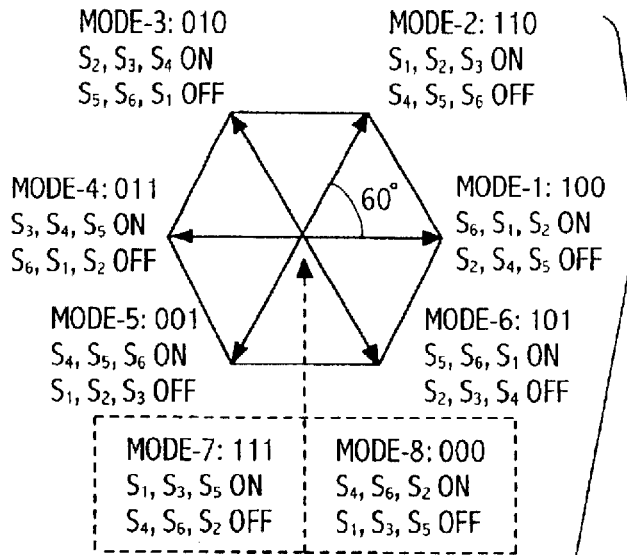
FIG. 3 is a diagram of state-space voltage vectors for pulse width modulated switching modes applicable to the circuit diagram of FIG. 2, in accordance with the present invention.

FIG. 3 will now be discussed as it relates to the operation of the system in FIGS. 1 and 2. There are eight modes that define the switching status of the inverter 16. These switching modes (mode 1 through mode 8) are shown in the diagram of state-space voltage vectors for pulse width modulated switching modes in FIG. 3. Wherever "modes" are discussed herein, the particular mode and corresponding number will be defined by the eight modes shown in FIG. 3. Also, for the inverter 16, the switching state for the second switch in each half-bridge 28 is always the opposite of the first switch in that corresponding half-bridge 28. That is, when $S_1$ is on then $S_4$ is always off, when $S_3$ is on then $S_6$ is off, and when $S_5$ is on then $S_2$ is off, and vice versa for each switch pair. For a numerical mode representation, a "1" signifies a switch "on" state for the first switch in each pair, and a "0" signifies a switch "Off" state for the first switch in each pair. For example, mode 3 is indicated as 0-1-0, which means that switches $S_2$, $S_3$, and $S_4$ are on, and $S_5$, $S_6$, and $S_1$ are off for this mode.

During normal vehicle operation (i.e. the motor is turning the drive wheels) the switching states corresponding to the modes illustrated in FIG. 3 are typically applied sequentially. But during a hill hold event, the machine 12 must deliver the appropriate torque at zero speed. To accomplish this requires DC phase currents, which requires a unidirectional bus voltage to be applied across the power switches 22. A zero speed strategy to maintain torque can be accomplished in many ways. However, many strategies use more power than is necessary or allow for too much concentration of power loss on certain components, which can lead to heating issues.

Figure 5:
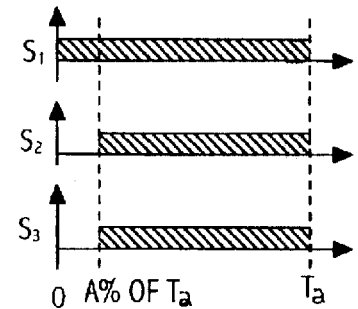
FIG. 5 is a chart of the switching patterns for three of the switches illustrated in FIG. 4.

FIGS. 4 and 5 illustrate a preferred switching pattern for a hill hold strategy that will minimize the power loss of the inverter 16 while also assuring that the power loss is distributed in the inverter 16. The machine controller 18 will employ this strategy by the timing and order of activating the power switches 22 on and off. A pulse-width-modulated switching period is identified as $T_a$, which is the inverse of the switching frequency, while A is a first percentage of the switching period $T_a$. FIG. 4 shows the on/off status for each transistor switch 24 ($Q_1$–$Q_6$) and diode 26 ($D_1$–$D_6$) during a switching period $T_a$. FIG. 5 shows the on/off state for the switches $S_1$, $S_3$ and $S_5$ during a switching period $T_a$, with Switches $S_4$, $S_6$, and $S_2$, respectively, having the opposite switch states.

In this first preferred hill hold operating strategy for minimizing and distributing the power loss on the inverter 16, the switching pattern includes maintaining the inverter 16 in mode 1 for A percent of the switching period $T_a$ and maintaining the inverter 16 in mode 7 for the remaining percentage of the switching period (i.e., 100-A% of $T_a$). The particular value of A is between one and ninety nine percent and depends upon the amount of torque required to hold the vehicle from rolling backwards—the higher the value of A, the higher the average bus voltage applied across the machine 12, which provides higher direct current flowing through the machine phases 30 for higher torque output at zero speed. Consequently, if the vehicle is resting on a very steep incline, then the value of A percent will be closer to 100 than if on a relatively flat road surface.

FIG. 6 illustrates the equations for power loss in each half-bridge 28 and the total inverter power loss for a switching period $T_a$. For these equations, $Q_c$ and $D_c$ represent the conduction loss on the particular main-switch and diode, respectively, when on for one hundred percent of the switching period $T_a$ carrying one unit of current. Also, $Q_s$ and $D_r$ are the switching loss on the particular main-switch and the reverse recovery loss on the diode, respectively, when carrying one unit of current at one unit of voltage. For a hill hold situation, with DC phase currents, one can approximate that the loss components $Q_c$ and $D_c$ are essentially the same, that $Q_c$ is essentially the same as $Q_s$ and that $D_r$ is relatively insignificant. Applying these approximations, one can tell from FIG. 6 that the power losses are close to equally distributed between the three half-bridges 28. The total inverter power loss is also a minimum value.

The hill hold strategy may employ two alternative switching patterns that also provide the appropriate torque at zero speed, while still minimizing and distributing the power losses among the inverter power switches. In the first alternative, mode 1 is replaced with mode 2 for A percent of $T_a$. In the second alternative, mode 1 is replaced with mode 6 for A percent of $T_a$. Mode 7 is still employed for the remaining percentage of the switching period $T_a$.

Figure 7:
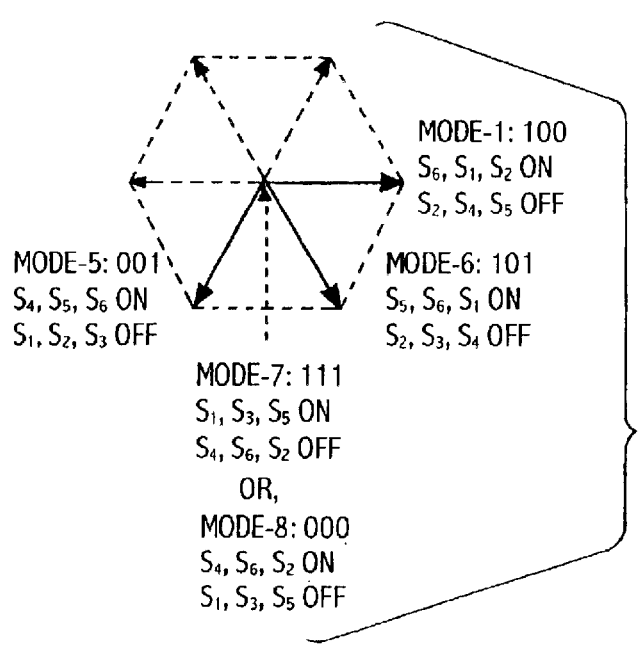
FIG. 7 is a diagram of state-space voltage vectors for pulse width modulated switching modes employed in a hill hold strategy that minimizes power loss on the machine phases, in accordance with the present invention.

While the hill hold operating strategy, employing one of the three switching patterns noted above, minimizes and distributes the power losses on the inverter 16, there may also be times when one is also concerned with the phase windings 30 of the machine 12. The phase current of the machine 12 becomes DC as the speed becomes zero. Consequently, another concern may arise in addition to minimizing and distributing the power losses in the inverter power switches—namely, this DC phase current may cause any one of the three phases 30 of the machine 12 to carry twice as much current as the other two. The resultant extra heat generated by the highly loaded phase winding can cause a load unbalance. This load unbalance can create additional complexity in the controller in order for the controller to account for the unbalance. FIGS. 7-9 illustrate a hill hold operating strategy (as applied to the vehicle 10 of FIGS. 1 and 2) that employs a switching pattern for more evenly balancing the heat distribution among the three phases 30, eliminating the need to add the above noted complexity to the controller.

FIG. 7 illustrates a pulse-width-modulated state-space vector for the modes used with a first preferred switching pattern employed to implement a hill hold operating strategy, while FIG. 8 illustrates the switching modes, switching status, switching patterns and corresponding phase currents for three regions associated with the hill hold strategy. Again, the switching patterns for switches $S_4$, $S_6$ and $S_2$ are not shown, as they are always the opposite of switches $S_1$, $S_3$ and $S_5$, respectively.

This hill hold strategy includes three regions (I, II and III) of switching patterns, with two modes employed in each region. For region 1, mode 1 is used A percent of switching period $T_a$, and mode 7 is used for the remaining percentage of the switching period $T_a$. For Region 11, mode 6 is used for A percent of $T_a$, and mode 8 is used for the remaining percentage of $T_a$. For Region III, mode 5 is used A percent of $T_a$, and mode 7 is used for the remaining percentage of $T_a$. For region 1, the magnitude of phase current $i_a$ from half-bridge $h_a$ is about double the magnitude of each phase current $i_b$ or $i_c$ coming from half-bridge $h_b$ or half-bridge $h_c$, respectively. For region II, phase current $i_b$ is about doubled, and for region III, phase current $i_c$ is about doubled. To balance the phase currents $i_a$, $i_b$, $i_c$ flowing into each phase winding $P_a$, $P_b$, $P_c$, respectively, each region operates about one third of a predetermined time period $T_p$, with $T_p$ being at least three times longer than $T_a$. The particular length of time period $T_p$ will preferably be set so as not to cause any displacement of the vehicle drive wheels 14 that can be detected by the vehicle operator, and may include factors such as the mechanical connectivity of the drive wheels 14 to the traction machine 12 and the inverter cooling cycle.

FIG. 9 illustrates the average $I^2R$ (i.e. heat) loss on each of the phase windings $P_a$, $P_b$, $P_c$ for each of the three operating regions I, II, III. In these equations, $R_p$ is the phase resistance of the machine. One will note that the average heat dissipation is the same for each phase winding $P_a$, $P_b$, $P_c$. Thus, the heat distribution is balanced, which avoids load unbalance and the need for a controller to account for such imbalance.

The hill hold ability for the vehicle is achieved, even though the machine is not rotating, by employing a switching pattern on the inverter to maintain the torque necessary to prevent the vehicle from rolling backwards. The particular switching pattern employed allows for minimizing the power loss while distributing the power in order to avoid any potential for overheating of inverter or machine components.

While certain embodiments of the present invention have been described in detail, those familiar with the art to which this invention relates will recognize various alternative designs and embodiments for practicing the invention as defined by the following claims.

What is claimed is:

1. A method of maintaining a vehicle in a stopped position on an incline comprising the steps of:

coupling a machine with at least a first phase, a second phase, and a third phase to at least one drive wheel of the vehicle;

selectively supplying energy to the first phase, the second phase and the third phase with a pulse width modulated inverter having at least a first half-bridge coupled to the first phase, a second half-bridge coupled to the second phase, and a third half-bridge coupled to the third phase; and maintaining a torque in the machine at an approximately zero rotational speed by switching the inverter between one of:

a mode 1 for a first percentage of a pulse width modulated switching period and a mode 7 for a remaining percentage of the pulse width modulated switching period;

a mode 2 for the first percentage of the pulse width modulated switching period and the mode 7 for the remaining percentage of the pulse width modulated switching period; and a mode 6 for the first percentage of the pulse width modulated switching period and the mode 7 for the remaining percentage of the pulse width modulated switching period.

2. The method of claim 1 wherein the step of maintaining the torque is further defined by employing the mode 1 and mode 7, and by increasing the first percentage of the mode 1 operation and correspondingly decreasing the remaining percentage of the mode 7 operation when the torque required to maintain the vehicle in a stopped position is increased.

3. The method of claim 1 wherein the step of maintaining the torque is further defined by employing the mode 2 and mode 7, and by increasing the first percentage of the mode 2 operation and correspondingly decreasing the remaining percentage of the mode 7 operation when the torque required to maintain the vehicle in a stopped position is increased.

4. The method of claim 1 wherein the step of maintaining the torque is further defined by employing the mode 6 and mode 7, and by increasing the first percentage of the mode 6 operation and correspondingly decreasing the remaining percentage of the mode 7 operation when the torque required to maintain the vehicle in a stopped position is increased.

5. A method of maintaining a vehicle in a stopped position on an incline comprising the steps of:

coupling a machine with at least a first phase, a second phase, and a third phase to at least one drive wheel of the vehicle;

selectively supplying energy to the first phase, the second phase and the third phase with a pulse width modulated inverter having at least a first half-bridge coupled to the first phase, a second half-bridge coupled to the second phase, and a third half-bridge coupled to the third phase; and maintaining a torque in the machine at an approximately zero rotational speed by:

switching the inverter between a mode 1 for a first percentage of a pulse width modulated switching period and a mode 7 for a remaining percentage of the pulse width modulated switching period, for about a first one third of a predetermined time period, with the predetermined time period being at least three times longer than the pulse width modulated switching period;

switching the inverter between a mode 6 for the first percentage of the pulse with modulated switching period and a mode 8 for the remaining percentage of the pulse width modulated switching period, for about a second one third of the predetermined time period; and switching the inverter between a mode 5 for the first percentage of the pulse width modulated switching period and the mode 7 for the remaining percentage of the pulse width modulated switching period, for about a third one third of the predetermined time period.

6. A hill hold apparatus for a vehicle comprising:

a machine adapted to couple to and drive at least one drive wheel of the vehicle, with the machine including at least a first phase, a second phase, and a third phase;

a pulse width modulated inverter having at least a first half-bridge coupled to the first phase, a second half-bridge coupled to the second phase, and a third half-bridge coupled to the third phase, with the inverter adapted to connect to a source of electrical energy; and a machine controller connected to and adapted to control the first half-bridge, to the second half-bridge and the third half-bridge of the inverter and including a hill hold strategy for controlling the inverter to maintain a torque in the machine at an approximately zero rotational speed by switching the inverter between one of:

a mode 1 for a first percentage of a pulse width modulated switching period and a mode 7 for a remaining percentage of the pulse width modulated switching period;

a mode 2 for the first percentage of the pulse width modulated switching period and the mode 7 for the remaining percentage of the pulse width modulated switching period; and a mode 6 for the first percentage of the pulse width modulated switching period and the mode 7 for the remaining percentage of the pulse width modulated switching period.

7. The hill hold apparatus of claim 6 further including a capacitor connected in parallel with at least one of the first half-bridge, the second half-bridge and the third half-bridge.

8. The hill hold apparatus of claim 6 wherein the machine is a permanent magnet motor.

9. The hill hold apparatus of claim 6 wherein the machine is an induction motor.

* * * * *